United States Patent [19]
Hatfield et al.

[11] Patent Number: 5,373,682
[45] Date of Patent: Dec. 20, 1994

[54] METHOD FOR TACKLESS PACKAGING OF HOT MELT ADHESIVES

[75] Inventors: Stephen Hatfield, Somerville; Shelley Gore, Neshanic Station, both of N.J.; David Fame, Newtown, Pa.; Anthony Rindone, Flemington, N.J.

[73] Assignee: National Starch and Chemical Investment Holding Corporation, Wilmington, Del.

[21] Appl. No.: 993,890

[22] Filed: Dec. 23, 1992

Related U.S. Application Data

[63] Continuation-in-part of Ser. No. 990,354, Dec. 15, 1992, abandoned, which is a continuation-in-part of Ser. No. 883,994, May 18, 1992.

[51] Int. Cl.$^5$ .............................................. B65B 55/14
[52] U.S. Cl. ........................................ 53/440; 53/450; 53/504; 206/524.7
[58] Field of Search ............... 206/0.84, 447, 524.7; 53/431, 440, 527; 264/24, 2 SS, 2 S

[56] References Cited

U.S. PATENT DOCUMENTS

| | | | |
|---|---|---|---|
| 2,639,808 | 5/1953 | Barry et al. | |
| 2,762,504 | 9/1956 | Sparks et al. | 206/84 |
| 3,314,536 | 4/1967 | Janota et al. | 206/84 |
| 3,469,363 | 9/1969 | Berckmoes | 53/440 |
| 3,564,808 | 2/1971 | Kent | 53/440 |
| 4,054,632 | 10/1977 | Franka | 264/145 |
| 4,106,261 | 8/1978 | Greenawalt | 53/450 |
| 4,137,692 | 2/1979 | Levy | 53/440 |
| 4,229,872 | 10/1980 | Rozmus | 53/440 |
| 4,275,864 | 6/1981 | Richards | 249/79 |
| 4,306,657 | 12/1981 | Levy | 206/447 |
| 4,334,615 | 6/1982 | Butler et al. | 206/447 |
| 4,450,878 | 5/1984 | Takada et al. | 53/440 |
| 4,681,712 | 7/1987 | Sakakibara et al. | 264/24 |
| 4,748,796 | 6/1988 | Viel | 53/411 |
| 4,755,245 | 7/1988 | Viel | 156/227 |
| 5,109,892 | 5/1992 | Somers | 53/440 |
| 5,112,552 | 5/1992 | Wittmann et al. | 264/255 |
| 5,160,686 | 11/1992 | Thaler et al. | 264/255 |
| 5,241,804 | 9/1993 | Tsuruta et al. | 53/504 |
| 5,257,491 | 11/1993 | Bouyer et al. | 53/428 |

FOREIGN PATENT DOCUMENTS

| | | |
|---|---|---|
| 0017394 | 10/1980 | European Pat. Off. |
| 0521661A1 | 1/1993 | European Pat. Off. |
| 0412867B1 | 9/1993 | European Pat. Off. |
| 8306785 | 4/1983 | France |
| 2603021 | 10/1985 | France |
| 8810552 | 7/1986 | France |
| 0469564 | 5/1992 | France |
| 3234065 | 4/1983 | Germany |
| 3138222 | 5/1983 | Germany |
| 3327289 | 2/1985 | Germany |
| 8628513 | 1/1987 | Germany |
| 8710132 | 10/1987 | Germany |
| 3625358 | 6/1989 | Germany |
| 47-36689 | 4/1972 | Japan |
| 2156302 | 10/1985 | United Kingdom |

OTHER PUBLICATIONS

Adhesives Abstracts, Jul., 1988; Czerny, H. R., *Residue-Free Packaging of Hot-Melt Pressure-Sensitive Adhesives*, Adhasion, 31, No. 5, May 1987, pp. 35–36.
Technical Bulletin, "Pack Free" for pressure sensitive hot melt adhesives, Superpack Ltd., Republic of Ireland.
Adhesives Age, Mar. 1992, by Jack Sievers, *Sausage Packs Offer Plusses Economically and Environmentally*, pp. 31–32.
Brochure, KartridgPak, *Chub Package Planning*, The KartridgPak Co., 4 pages.
Brochure, Chub Packaging, Machines by KatridgPak, *Efficient High-Production Packaging for a Wide Variety of Products*, 8 pages.
Technical Data Sheet for Armin Polyfilm.

*Primary Examiner*—W. Donald Bray
*Attorney, Agent, or Firm*—Ellen T. Dec

[57] ABSTRACT

A non-blocking hot melt adhesive mass is packaged by directly pouring or pumping the molten adhesive into a cylindrical plastic tube, the cylindrical tube being in contact with a heat sink. The resultant adhesive package is provided in a readily handable cartridge form which may be produced in a continuous line operation.

22 Claims, 2 Drawing Sheets

METHOD FOR TACKLESS PACKAGING OF HOT MELT ADHESIVES

This is a continuation-in-part of application Ser. No. 07/990,345 filed Dec. 15, 1992, now abandoned, which was a continuation-in-part of application Ser. No. 07/883,994 filed May 18, 1992.

This invention relates to a method for packaging hot melt adhesives compositions and to the resulting packaged adhesive compositions.

Hot melt adhesives which are generally applied while in the molten or liquid state are solid at room temperature. Typically, these adhesives are provided in the form of blocks and because of the nature of these materials, particularly the pressure sensitive hot melts, there are problems associated with handling and packaging them. The solid adhesive blocks not only stick or adhere to hands or mechanical handling devices and to each other, but they also pick up dirt and other contaminants. Additionally, certain applications which require high tack formulations result in blocks that will deform or cold flow unless supported during shipment. The need and advantages for providing tackless or non-blocking hot melt adhesives are apparent and various ways of accomplishing this have been developed.

Japanese Patent 48-103635 published Dec. 26, 1973 discloses a granular adhesive which is tacky at room temperature coated or enveloped with a non-tacky hot meltable material that is the same type or is miscible or mixable with it.

French Patent 2,544,654 published Oct. 26, 1984 discloses forming a tackless hot melt by adding molten hot melt to a mold containing a preformed support layer having a transfer film thereon which is compatible with the hot melt.

U.S. Pat. No. 4,748,796 issued Jun. 12, 1988 and U.S. Pat. No. 4,755,245 issued Jul. 5, 1988 disclose forming a protective coating for an adhesive material by electrostatically coating a mold or cavity with a powder screen and then pouring hot melt into the mold.

French Patent 2,601,616 published Oct. 22, 1988 discloses forming blocks of hot melt pressure sensitive adhesives by casting the pressure sensitive adhesive into molds precoated by spraying with a film of non self-sticking hot melt material thereby forming a fusible non-tacky veil around the pressure sensitive block.

In German Patent 22 48 046 the hot melt adhesive is squeeze-cut into pillow-shaped pieces; the pieces subsequently cooled and solidified.

Still other patents teach coating or wrapping the formed hot melt block with various types of plastic films. Thus, German Patents No. DE 31 38 222 and 32 34 065 disclose coating the circumference of elongated hot melt portions with a thin polyolefin film. German Patent 36 25 358 to Hausdorf teaches wrapping the solid hot melt block in a thermoplastic, especially copolyamide film with a melting point of 120° C. to 150° C., which EP application 0 469 564 to Rouyer et al. discloses wrapping the solidified hot melt in a plastic packaging material.

All the later methods have provided some degree of improvement in the packaging and handling of hot melt adhesives however they have suffered by virtue of either the need to unwrap or otherwise unpackage the hot melt or, in the cases of coated hot melts which are added directly to the melting pots, by virtue of the contamination resulting from the build up over time of large quantities of the packaging materials in the melt pot and application equipment.

In order to overcome the disadvantages inherent in the methods of the prior art, copending application Ser. No. 07/883,994 filed May 18, 1992 discloses the finding that when the hot melt adhesive is poured in its molten state into a mold or cavity lined with plastic packaging film and then allowed to solidify, the adhesive is fused to some extent into the film, resulting in a non-blocking adhesive package which will melt faster in the melt pot and will not cause a build up of undesirable plastic residue even after extended periods of time. Thus, the intermolecular transfer of one or more of the hot melt components into the contact surface of the plastic film allows some mixing or compatibilizing of the film and the hot melt thereby improving the opportunity for more complete mixing of the hot melt and film when remelting of the packaged hot melt occurs. The method provides an additional benefit over prior non-blocking packages in that the package itself is air-tight allowing no air to be entrapped therein. The presence of entrapped air in prior packages has been blamed for a variety of problems including incomplete melting and blending of the packaging material into the adhesive whereby the packaging material floats on the surface of the hot melt and/or adheres to the walls of the melt pot.

Since the melting point of the plastic film should be comparable to, and preferably lower than, the melting point of the hot melt adhesive in order to provide for satisfactory melting in the melt pot which does not have a source of agitation, it is necessary that the lined mold be a heat sink or be in contact with a heat sink so as to remove excess heat from the film as quickly as possible and thereby prevent melting, burning or charring of the plastic film wrap.

Thus, the prior application was directed to a method for packaging hot melt adhesives comprising the steps of:

a. lining a mold with a plastic film, said film being meltable together with the adhesive composition and blendable into said molten adhesive composition, and said mold being in contact with a heat sink;

b. pouring the molten hot melt adhesive into the lined mold; and c. allowing the molten hot melt adhesive to solidify.

In accordance with a preferred embodiment of that method, we have now found that the molten adhesive may be directly pumped or poured into a cylindrical plastic tube, the cylindrical tube being in contact with a heat sink. The resultant adhesive package is thus provided in a readily handable cartridge form which may be produced in a continuous line operation and which additionally possesses all the advantages of the easily processable non-blocking adhesive package of the parent application.

The method of the present invention is adaptable to the packaging of virtually any type of hot melt adhesive composition. It is especially adapted to the packaging of thermoplastic or thermosetting pressure sensitive adhesives where the handling problems are most severe. As examples the method disclosed herein may be used to package hot melt adhesives prepared from polymers and copolymers of synthetic resins, rubbers, polyethylene, polypropylene, polyurethane, acrylics, vinyl acetate, ethylene vinyl acetate and polyvinyl alcohol. More specific examples include hot melt adhesives prepared from the following:

a. rubber polymers such as block copolymers of monovinyl aromatic hydrocarbons and conjugated diene, e.g., styrene-butadiene, styrene-butadiene-styrene, styrene-isoprene-styrene, styrene-ethylene-butylene-styrene and styrene-ethylene propylene-styrene;

b. ethylene-vinyl acetate polymers, other ethylene esters and copolymers, e.g., ethylene methacrylate, ethylene n-butyl acrylate and ethylene acrylic acid;

c. polyolefins such as polyethylene and polypropylene;

d. polyvinyl acetate and random copolymers thereof;

e. polyacrylates;

f. polyamides;

g. polyesters;

h. polyvinyl alcohols and copolymers thereof;

i. polyurethanes;

j. polystyrenes;

k. polyepoxides;

l. graft copolymers of vinyl monomer(s) and polyalkylene oxide polymers; and m. aldehyde containing resins such as phenol-aldehyde, urea-aldehyde, melamine-aldehyde and the like.

Most often such adhesives are formulated with tackifying resins in order to improve adhesion and introduce tack into the adhesive. Such resin include, among other materials, (a) natural and modified resins, (b) polyterpene resins, (c) phenolic modified hydrocarbon resins, (d) coumarone-indene resins, (e) aliphatic and aromatic petroleum hydrocarbon resins, (f) phthalate esters and (g) hydrogenated hydrocarbons, hydrogenated rosins and hydrogenated rosin esters.

Desirable optional ingredients include diluents, e.g., liquid polybutene or polypropylene, petroleum waxes such as paraffin and microcrystalline waxes, polyethylene greases, hydrogenated animal, fish and vegetable fats, mineral oil and synthetic waxes as well as hydrocarbon oils such as naphthionic or paraffinic mineral oils.

Other optional additives may include stabilizers, antioxidants, colorants and fillers. The selection of components and amounts as well as the preparation thereof are well known in the art and described in the literature.

The thermoplastic film into which the molten adhesive is poured may be any film which is meltable together with the adhesive composition and blendable into said molten adhesive and which will not deleteriously affect the properties of the adhesive composition when blended therewith. Suitable thermoplastic materials include ethylene based polymers such as ethylene/vinyl acetate, ethylene acrylate, ethylene methacrylate, ethylene methyl acrylate, ethylene methyl methacrylate, high and low density polyethylene, polyethylene blends and chemically modified polyethylene, copolymers of ethylene and C 1-6 mono- or diunsaturated monomers, polyamides, polybutadiene rubber, polyesters such as polyethylene terephthalate, polybutylene terephthalate, etc.; thermoplastic polycarbonates, atactic poly-alpha-olefins, including atactic polypropylene; thermoplastic polyacrylamides, polyacrylonitrile, copolymers of acrylonitrile and other monomers such as butadiene, styrene, etc., polymethyl pentene, polyphenylene sulfide, aromatic polyurethanes; styrene-acrylonitrile, acrylonitrile-butadiene-styrene, styrene-butadiene rubbers, polyethylene terephthalate, acrylonitrile-butadiene-styrene elastomers, polyphenylene sulfide as well as polyvinyl aromatic-rubber block copolymers.

The films may, if desired, contain antioxidants for enhanced stability as well as other optional components such as fatty amides or other processing aids, anti-stats, stabilizers, plasticizers, dyes, perfumes, fillers and the like.

The specific thermoplastic film utilized will depend, in large part, on the composition and melting point of the hot melt adhesive being packaged, with the softening point of the film generally being less than about 125° C. Particularly preferred for most hot melt adhesives are thermoplastic films of low density polyethylene or polyethylene vinyl acetate wherein the amount of vinyl acetate is 0 to 10 %, preferably 3 to 5 %, by weight. Especially preferred are such films having a melt flow index of 0.5 to 10.0; a softening point of 100° C. to 120° C. and a specific gravity of 0.88 to 0.96. One example of these films is available commercially from Armin Polyfilm under the Armin 501 trade name. For best results in reprocessing, it is preferred that the specific gravity of the packaging film be the same as or less than the specific gravity of the molten hot melt adhesive.

The thickness of the film utilized generally varies between about 0.1 mil to 5 mil, preferably 0.5 mil to 4 mil. The thickness of the particular film also varies depending upon the temperature at which the molten adhesive is pumped or poured into the plastic film cylinder. The particular viscosity at which the adhesive can be introduced into the plastic film cylinder will vary depending on a variety of factors including the pumping capacity of the pump, the strength of then plastic film and the like viscosities in the range of 1,000 to 200,000 cps, preferably 2,000 to 100,000 may be utilized. However, we have found that the most preferred viscosity of the adhesive which is to be packaged in accordance with the invention is between 10,000 and 50,000 cps. It will be recognized that the temperature at which an adhesive composition will exhibit this viscosity range will vary from one adhesive to another. In the case of adhesives which obtain their viscosity within the temperature range of 110 to 130° C., film thicknesses of about 1.25 mil are preferred; while for adhesives which exhibit this viscosity at temperatures of 130 to 150° C., films of about 1.5 mil are preferred.

It is further preferred that the thermoplastic film comprise not more than about 1.5 % by weight of the total adhesive mass and that it optimally vary from 0.2 to 1.0 % by weight of the mass in order to prevent undue dilution of the adhesive properties.

The heat sink which is critical to the success of the method of the present invention may comprise any means which will effectively and rapidly remove or absorb the excess heat from the entire surface of the film which is in contact with the molten hot melt adhesive composition so as to prevent the temperature of the film from exceeding its melting point even though the molten hot melt adhesive temperature is higher than the film melting temperature. Suitable heat sinks are provided by spraying the surface of the cylindrical plastic tube with cooled water or other refrigerant means such as chilled glycol, liquid or gaseous nitrogen, compressed carbon dioxide or the like. The spraying may be accomplished, for example, using a series of spray nozzles aimed at the mandrel mandrel so as to provide a curtain or cascade of water or refrigerant around the entire circumference of the cylinder.

As discussed above, the molten adhesive is generally poured or pumped into the plastic film cylinder at a temperature at which the molten adhesive exhibits a viscosity of 1,000 to 200,000, preferably 10,000 to 50,000 cps. This temperature will generally vary from about 110° to about 150° C. depending upon the particular adhesive. After filling, the adhesive cartridges, either individually or in a connected series, are further cooled to ambient temperature prior to bulk packaging. The latter cooling may be done by air or may be hastened by submerging the cartridge in chilled water or another refrigerant medium such as liquid or gaseous nitrogen, compressed carbon dioxide or the like.

Since the adhesive is pumped or poured continuously through the mandrel into the plastic film cylinder, it is possible to void and then cut the continuous filled tube into individual cartridges at virtually any desired length. In general, the individual cartridges are produced in a variety of sizes ranging from about three inches to 18 inches in length and varying in weight, depending upon length, from about 0.5 to five pounds.

The resultant individually packaged hot melt adhesive cartridges can be stored, handled and used without any problems of the individual blocks sticking together, adhering to other objects, or becoming contaminated even if exposed to increased pressure and/or temperature. When it is desired to ultimately utilize the adhesive, the entire wrapped cartridge is added to the melt pot. As an advantage of the present method, the fact that the adhesive is poured or pumped into the plastic film cylinder in its molten form creates some degree of fusion between the adhesive and the film. Because of this fusion, very little additional energy is required to melt and blend the film into the adhesive itself. Further, the absence of any entrapped air results in a homogeneous melting of the adhesive with no plastic film undesirably separating from the wrapped adhesive and floating to the surface and/or sides of the melting pot.

The thus packaged hot melt adhesive cartridge may, of course, additionally be packaged in a second outer container to further reduce its exposure to the environment, moisture or other contaminants. The secondary wrappings would then be removed by conventional procedures prior to utilization of the hot melt adhesive.

A preferred embodiment of the method of the invention described herein is illustrated in FIG. 1. In the Figure, the plastic film (1) is passed through a series of idler rollers (2) which smoothes the film and controls the tension across the web. The film is then threaded into a film folder (3) which folds the film and forms a lap seal around a one to four inch diameter fill pipe or mandrel (4). The lap seal is sealed with hot air (5), induction sealing or ultrasonic welding and then may be further sprayed with cooling air to set the seal.

After the seal has set, the tubular film is carried along the exterior of the fill pipe preferably using a series of spreader rings (6), film guide(s) (7) and drive wheels (8) until it reaches the end of the fill pipe, at which point the molten hot melt adhesive, pumped from a remote holding container through the mandrel enters the cylindrical plastic tube (9). If desired, in order to maintain the desired molten viscosity, the fill pipe may be insulated or jacketed as with double walls and filled with inlet and outlet ports (10) through which heated water, steam or mixtures thereof may be circulated, so as to prevent premature cooling of the molten adhesive in the mandrel and melting of the plastic film on the mandrel. The double wall construction also facilitates complete cleaning and purging of the mandrel after the filling operation is completed.

During filling, the tubular package is in contact with cooling water (11) or other refrigerant medium. This water contact may be accomplished using a series of water jets positioned around the circumference of the cylindrical tube. Alternatively, a water or cooling ring (12) or series of water or cooling rings may be positioned around the mandrel. In a preferred embodiment (illustrated in FIG. 2), a water ring (12) is positioned around the filling end of the mandrel and a channel (21) is cut into the entire interior circumference thereof. Water or other refrigerant enters the ring through at least one inlet (22), flowing through the opening at the inside edge of the channel (23) thereby forming a curtain coating or cascade of water around the entire outer surface of the plastic cylindrical tube. If desired, the inner channel may be baffled to allow for uniform distribution of the water. It will be recognized that while the term "spraying with coolant" is utilized herein, the invention also contemplates carrying out the entire filling operation in a cooled environment as in the presence of liquid nitrogen.

Subsequently, the adhesive filled tube is passed through voider rolls (13) which crimp or pinch the continuous filled cylinder into smaller cartridge sized segments and which are set so as to assure the proper cartridge length. Spraying with coolant is continued through additional spray nozzles (14) until the package is sufficiently cooled so that the packaged adhesive forms a self-seal formed at the voided portions. The cartridge packages may then be cut at the voided area using conventional means, e.g. mechanical scissor (15), laser cutter, water jet or a heated knife or wire and subsequently cooled to room temperature. Alternatively, the voided but uncut cartridge segments, still attached in serial form may be cooled and cut thereafter.

The cooling to room temperature may be accomplished entirely under ambient conditions, in a chilled air environment or may be hastened by submersion of the cartridges into a bath of cooled water, glycol, liquid nitrogen or the like.

EXAMPLE

Figure 1:
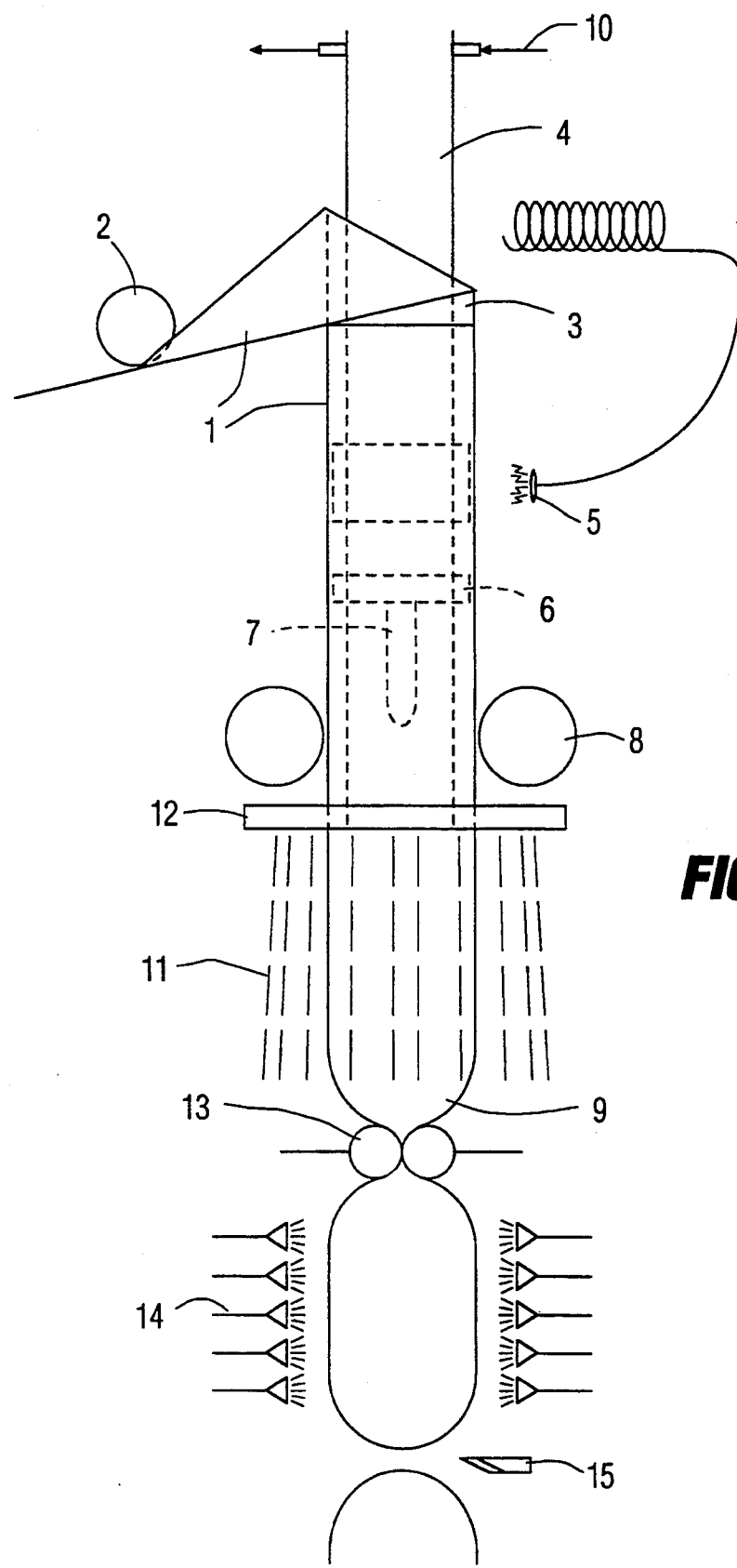
FIG. 1 shows a preferred embodiment of the invention.
Figure 2:
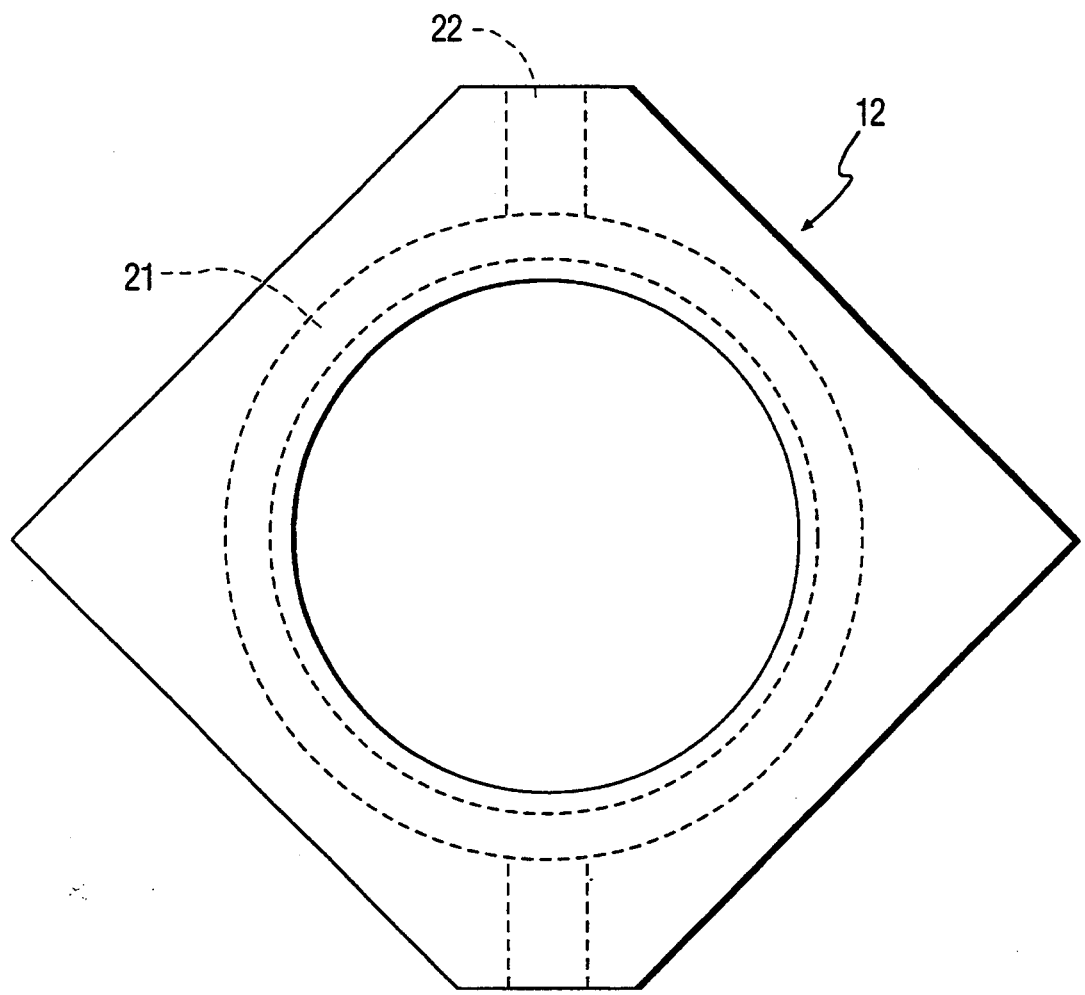
FIG. 2 shows a pop view of the water ring of the invention.

A conventional pressure sensitive hot melt adhesive composition suitable for disposable applications was prepared using a tackified and plasticized styrene-butadiene-styrene block copolymer.

A continuous supported cylindrical tube was formed by wrapping a plastic film comprising a 1.2 mil low density polyethylene film around a 1.5 inch diameter insulated mandrel or fill pipe. After the lap seam was formed, it was sealed using hot air and then set by spraying with ambient temperature air.

The molten hot melt adhesive, at a viscosity of 20,000–30,000 cps. (120°–130° C.) was pumped therein through a nozzle while the entire surface of the film was sprayed with chilled water (5°–10° C.). The filled tubes were voided at lengths of 6 inches and then cut to form individual cartridges. The resultant cartridges were allowed to cool in a chilled water bath until they had completely solidified and could be packaged in appropriate shipping containers.

The resultant cartridges had a film add-on content of about 0.25% and were characterized in that the plastic wrapping film was fused into the hot melt adhesive composition and, except for the area of the lap seam, could not be physically separated therefrom.

For testing purposes, the plastic film utilized in these cartridges was added to molten samples of the hot melt adhesive (175° C.) at add-on levels of 0.25%. The samples were subjected to 24 hour stability testing and compared with the same size sample of the molten adhesive which did not contain any film. After 24 hours, 2 mil coatings were made of the two products, the coatings were aged under constant temperature and humidity conditions overnight and tested for looptack and adhesion on high density polyethylene using the following procedures:

Test Procedures

Adhesive Strength: The adhesion to stainless steel and to Mylar (polyester) film was measured by peeling the tape backing over itself 180° C. at a constant speed (by a force applied to the free end of the tape) from high density polyethylene to which it has been applied by a fixed pressure. For the techniques used in conducting this test, see the 180° peel adhesion test PSTC-1 of the Pressure Sensitive Tape Council. This test can be performed only on adhesive formulations which are pressure sensitive and is a measure of the strength or tenacity of the adhesive.

Loop Tack: Loop tack is measured by means of a loop tack tester (Testing machines, Inc., Amityville, NY). The latter records the force, measured in ounces, to remove a one-inch by five-inch adhesive coated test strip, formed in the shape of a loop, from a polyethylene substrate having one square inch of contact. The results presented are the average of at least three tests.

TABLE 1

| Test | Control | Sample with Film |
| --- | --- | --- |
| Adhesive Strength (aged) | 4.1 lb/linear inch | 3.8 lb/linear inch |
| Loop Tack (aged) | 47.3 oz/in$^2$ | 42.7 oz/in$^2$ |

Similar results were obtained when a styrene-ethylene-butylene-styrene based pressure sensitive hot melt adhesive was thus packaged in a plastic film comprising polyethylene and an ethylene vinyl acetate copolymer containing 4 % vinyl acetate (Armin 501 available from Armin Polyfilm and having a melt temperature 110° C). These adhesives cartridges were evaluated for use as a positioning adhesive at 0.25 % and 0.50 % film add-on levels using conventional industry tests. No detrimental effects were observed by the incorporation of the melted plastic film wrapping into the molten hot melt adhesive composition.

A pressure sensitive adhesive containing a blend of styrene-butadiene-styrene and styrene-ethylene-butylene-styrene block copolymers and adapted for labelling applications was packaged at a viscosity range of 20,000–30,000 cps as described above using a plastic film comprising polyethylene and an ethylene vinyl acetate copolymer containing 4 % vinyl acetate (Armin 501 available from Armin Polyfilm and having a melt temperature 110° C.). For testing purposes, the plastic film coated adhesive cartridges were added to a melt pot, remelted at 150° C. and tested for adhesion using oriented polypropylene (OPP) and polyethylene terephthalate (PET) substrates. The samples were also tested for stability. The results of the testing are shown in Table 2.

TABLE 2

| | Film Wrapped Adhesive | Control |
| --- | --- | --- |
| Viscosity 132° C. | 1210 | 1125 |
| Ball & Ring Softening Point | 68° C. | 68° C. |
| OPP/PET Bonds @ RT | 2 @ 100% Polytear | 2 @ 100% Polytear |
| @ 4° C. | 1 @ 90% Polytear  1 @ 60% Polytear | 1 @ 90% Polytear  1 @ 70% Polytear |
| Stability Viscosity @ 120° C. | 635 | 460 |
| After 72 hours @ 177° C. | No skin, gel, char., edge ring or vols. | No skin, gel, char., edge ring or vols. |

As the results of Table 2 show, the film wrapped cartridges had performance qualities similar to those observed with uncoated adhesive. Thus, there were no detrimental effects observed by the introduction of the plastic film into the molten adhesive.

The results of the above tests show that the adhesive properties of the adhesive blocks are unaffected by the admixture with the packaging material. Similar results would also be obtained when packaging other hot melt adhesive formulations.

We claim:

1. A method for the continuous packaging of hot melt adhesive compositions comprising the steps of:
   a. pumping or pouring molten hot melt adhesive in liquid form into a cylindrical plastic tube of plastic film, the cylindrical tube being in direct contact with cooled water or a cooled liquid or gaseous environment, the adhesive being poured or pumped at a temperature at or above the melting point of the plastic film and the plastic film being meltable together with the adhesive composition and blendable into said molten adhesive without deleteriously affecting the properties of the adhesive;
   b. sealing the molten hot melt adhesive filled cylinder; and
   c. allowing the molten hot melt adhesive filled cylinder to solidify.

2. The method of claim 1 wherein the molten hot melt adhesive is poured or pumped into the cylindrical plastic tube at a molten viscosity of 1,000 cps. to 200,000 cps.

3. The method of claim 1 wherein the molten hot melt adhesive is poured or pumped into the cylindrical plastic tube at a molten viscosity of 2,000 cps. to 100,000 cps.

4. The method of claim 1 wherein the molten hot melt adhesive is poured or pumped into the cylindrical plastic tube at a molten viscosity of 10,000 cps. to 50,000 cps.

5. The method of claim 4 wherein the molten hot melt adhesive is poured or pumpted into the cylindrical plastic tube at a molten viscosity of 20,000 cps. to 30,000 cps.

6. The method of claim 1 wherein the cylindrical plastic tube is formed by wrapping the plastic film around a mandrel and forming a seal at the overlap of the film, and wherein the molten hot melt adhesive is pumped through the mandrel into the cylindrical plastic tube at the bottom end of the mandrel.

7. The method of claim 6 wherein the mandrel is double walled and adapted with inlet and outlet ports to allow heated water, steam or a mixture thereof to be circulated therethrough.

8. The method of claim 6 wherein the mandrel has a diameter of one to four inches.

9. The method of claim 1 wherein the hot melt adhesive is a pressure sensitive hot melt adhesive.

10. The method of claim 1 wherein the plastic film is selected from the group consisting of ethylene based polymers, polyamides, polybutadiene rubber, polyesters, polycarbonates, atactic poly-alpha-olefins, thermoplastic polyacrylamides, polyacrylonitrile and copolymers thereof, polymethyl pentene, polyphenylene sulfide, aromatic polyurethanes, styrene-acrylonitrile, acrylonitrile-butadiene-styrene, styrene-butadiene rubbers, polyethylene terephthalate, polyphenylene sulfide and polyvinyl aromatic-rubber block copolymers.

11. The method of claim 1 wherein the plastic film is a low density polyethylene or a polyethylene vinyl acetate polymer containing up to 10 % by weight vinyl acetate.

12. The method of claim 1 wherein the plastic film is present in an amount of 0.2 to 1.0 % by weight of the adhesive mass.

13. The method of claim 1 wherein the specific gravity of the plastic film is the same as or less than that of the molten hot melt adhesive.

14. The method of claim 1 wherein the molten adhesive is poured into the plastic film cylinder at a temperature of 110°–130° C. and wherein the thickness of the plastic film is 1.25 mil.

15. The method of claim 1 wherein the molten adhesive is poured into the plastic film cylinder at a temperature of 130° to 150° C. and wherein the thickness of the plastic film is 1.5 mil.

16. The method of claim 1 wherein the hot melt adhesive is prepared from a rubbery block copolymer.

17. The method of claim 1 wherein the hot melt adhesive filled cylinder is sealed by passing through voider rolls.

18. A non-blocking hot melt adhesive mass prepared by a continuous method which comprises the step of;
   a. pumping or pouring molten hot melt adhesive in liquid form into a cylindrical plastic tube of plastic film, the film having a thickness of 0.1 to 5 mil, and being meltable together with the adhesive composition and blendable into said molten adhesive without deleteriously affecting the properties of the adhesive, the cylindrical tube being in direct contact with cooled water or a cooled liquid or gaseous environment, the adhesive being poured or pumped at a temperature at or above the melting point of the plastic film;
   b. sealing the molten hot melt adhesive filled cylinder, and
   c. allowing the molten hot melt adhesive filled cylinder to solidify.

19. In an apparatus for the continous filling of molten hot melt adhesive compositions wherein the flowable material is passed through a mandrel into a cylindrical plastic tube, said tube having been formed by wrapping a plastic film around the mandrel so as to form a lapped area and subsequently sealing said lap, the improvement which comprises positioning a cooling means at the filling end of the mandrel such that cooled water or other refrigerant impinges directly upon the entire surface of the plastic tube during the filling of the tube with the molten hot melt adhesive thereby allowing the molten hot melt adhesive to be filled into the plastic tube at a temperature greater than or the same as the melting point of the plastic film.

20. The apparatus of claim 18 wherein the cooling means comprises at least one water or cooling ring, the ring having a channel cut into the entire interior circumference thereof permitting a continuous flow of water or refrigerant to impinge on the surface of the plastic tube.

21. A method for the continuous packaging of hot melt adhesive compositions comprising the steps of;
   a. pumping or pouring molten hot melt adhesive in liquid form into a cylindrical plastic tube of plastic film, the film meltable and blendable together with the adhesive without deleteriously affecting the properties thereof and having a thickness of 0.1 to 5 mil, the cylindrical tube being in direct contact with cooled water or a cooled liquid or gaseous environment, the adhesive being poured or pumped at a temperature at or above the melting point of the plastic film;
   b. sealing the hot melt adhesive filed cylinder; and
   c. allowing the molten hot melt adhesive filled cylinder to solidify.

22. The method of claim 21 wherein the hot melt adhesive filled cylinder is sealed by passing through voider rolls.

* * * * *